United States Patent [19]

Heimendinger

[11] Patent Number: 5,328,039
[45] Date of Patent: Jul. 12, 1994

[54] DEVICE FOR HOOKING DECORATION OR SIMILAR ELEMENTS ONTO ALL TYPES OF SHELF-UNITS

[75] Inventor: Bernard Heimendinger, Montmorency, France

[73] Assignee: Fapec, France

[21] Appl. No.: 900,357

[22] Filed: Jun. 18, 1992

[30] Foreign Application Priority Data

Jun. 21, 1991 [FR] France ............... 91 07635

[51] Int. Cl.⁵ .............. F16B 5/02; A47F 10/02; F16M 11/00
[52] U.S. Cl. .............. 211/183; 248/231.4; 248/244; 248/316.4; 40/606
[58] Field of Search .............. 211/183, 189; 248/231.2, 231.3, 231.4, 241, 244, 316.4, 316.6, 424, 429; 40/606, 607

[56] References Cited

U.S. PATENT DOCUMENTS

| | | | |
|---|---|---|---|
| 751,832 | 2/1904 | Cahn et al. | 40/606 |
| 2,328,252 | 8/1943 | Barker | 248/231.3 |
| 3,236,481 | 2/1966 | Howard | 40/606 |
| 3,939,986 | 2/1976 | Pierro | 248/231.4 |
| 4,038,767 | 8/1977 | Chasin et al. | 40/606 |
| 4,802,708 | 2/1989 | Vos et al. | 248/231.4 |

Primary Examiner—P. Austin Bradley
Assistant Examiner—Erik R. Puknys
Attorney, Agent, or Firm—William A. Drucker

[57] ABSTRACT

The device includes two identical half-rails disposed symmetrically with respect to the upper longitudinal edge of the wall of the shelf-unit. Each half-rail includes one member whose internal face is welded to an angle steel with a horizontal wing, and one central support plate in support on blocks secured to the horizontal wings. The plate has transverse cracks superimposed on guiding holes borne by the blocks. The mutual spacing of the half-rails is adjusted at will and the entire unit is fixed in the selected position by a screw traversing the superimposed crack and hole. A mobile support member of a decoration element includes superimposed elements each having horizontal wings housing a horizontal guiding track integral with the central plate. Screws are able to tighten together the elements so as to immobilize the support member in any selected position along the guiding track.

5 Claims, 3 Drawing Sheets

DEVICE FOR HOOKING DECORATION OR SIMILAR ELEMENTS ONTO ALL TYPES OF SHELF-UNITS

FIELD OF THE INVENTION

The present invention concerns securing elements, such as decoration or linear valorization elements or information elements, to display furniture items with superimposed plates used in self-service stores and generally denoted as shelf-units.

BACKGROUND OF THE INVENTION

There are a large number of types of shelf-units currently used in self-service stores and these shelf-units differ from one another, especially as regards their dimensions, in particular their width and thickness. Owing to these differences, when it is desired to hook decoration, information or valorization elements, it is necessary to use a hooking device particularly adapted to the dimensions of the shelf-unit in question, this adaptation constituting a complication in that a complete range of hooking devices need to be retained, each hooking device being adapted to a particular type of shelf-unit.

SUMMARY OF THE INVENTION

The object of the present invention is able to resolve this drawback and, to this effect, offers a hooking device of simple design, produced at a lower cost, easy to use and being able to be secured to any type of shelf-unit.

According to the invention, the device includes two identical half-rails intended to be disposed on both sides of the upper longitudinal edge of the shelf-unit wall to be equipped, and one horizontal central element in support on- internal horizontal wings opposite the two half-rails, said horizontal central element having transverse oblong cracks opposite guiding holes borne by said horizontal wings of the half-rails, a screw traversing each oblong crack and the associated guiding hole making it possible to adjust the mutual spacing of the half-rails, thus authorizing adaptation of the device to shelf-unit walls with various thicknesses.

Over the length of the rail, the horizontal central element has two opposing horizontal guiding tracks, whereas a support element, composed of two elements comprising superimposed horizontal wings disposed on both sides of the horizontal guiding track, guides the movement of the support piece along the rail and, when the two elements of the support piece are clamped against each -other, immobilizes the latter in any desired position. The upper face of the support piece is integral With any suitable member (rack, tube, etc) for fixing a decoration or signalling element. Of course, it is possible to mount on the rail the number of independent support members required so as to support the decoration element.

So as to equip the wall of a shelf-unit with a decoration element by means of the hooking device of the invention, the two half-rails and the central element are assembled by embodying the maximum spacing of the half-rails, the support pieces adapted to the selected decoration element are mounted on the central element and, after having adjusted the position of the support pieces and immobilized them in this position, the rail is placed via the support of the horizontal wings of the half-rails on the upper edge of the wall. It then merely suffices to bring together the half-rails so as to clamp said wall and then immobilize the half-rails in this position by engaging a screw in each unit formed by one oblong crack and the corresponding guiding hole.

BRIEF DESCRIPTION OF THE DRAWINGS

So as to clearly understand the device of the invention, there now follows a non-restrictive example of a preferred embodiment with reference to the accompanying diagrammatic drawing on which.

DETAILED DESCRIPTION OF THE PREFERRED EMBODIMENTS

Figure 1:
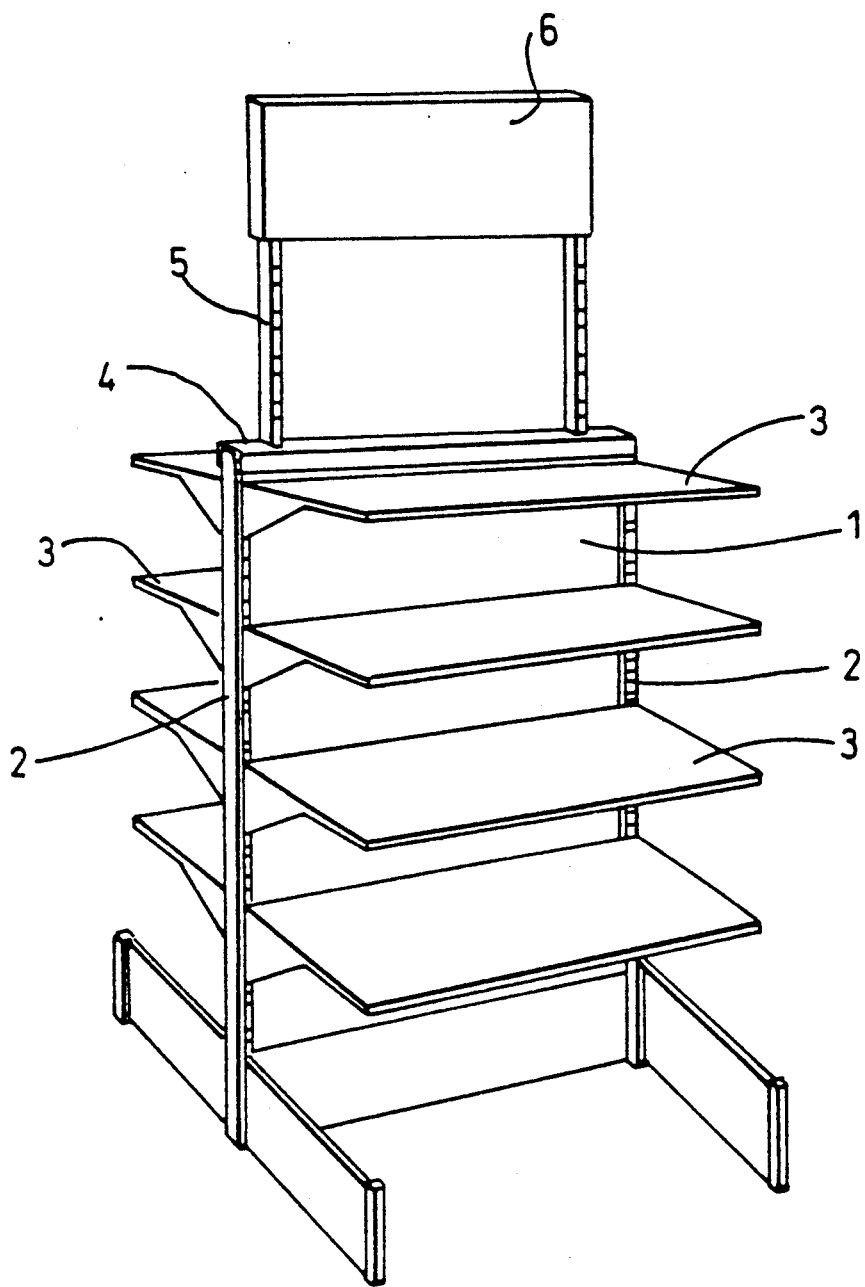
FIG. 1 is a perspective view of a shelf-unit equipped with a device conforming to the invention and used to hook a luminous fronton.
Figure 2:
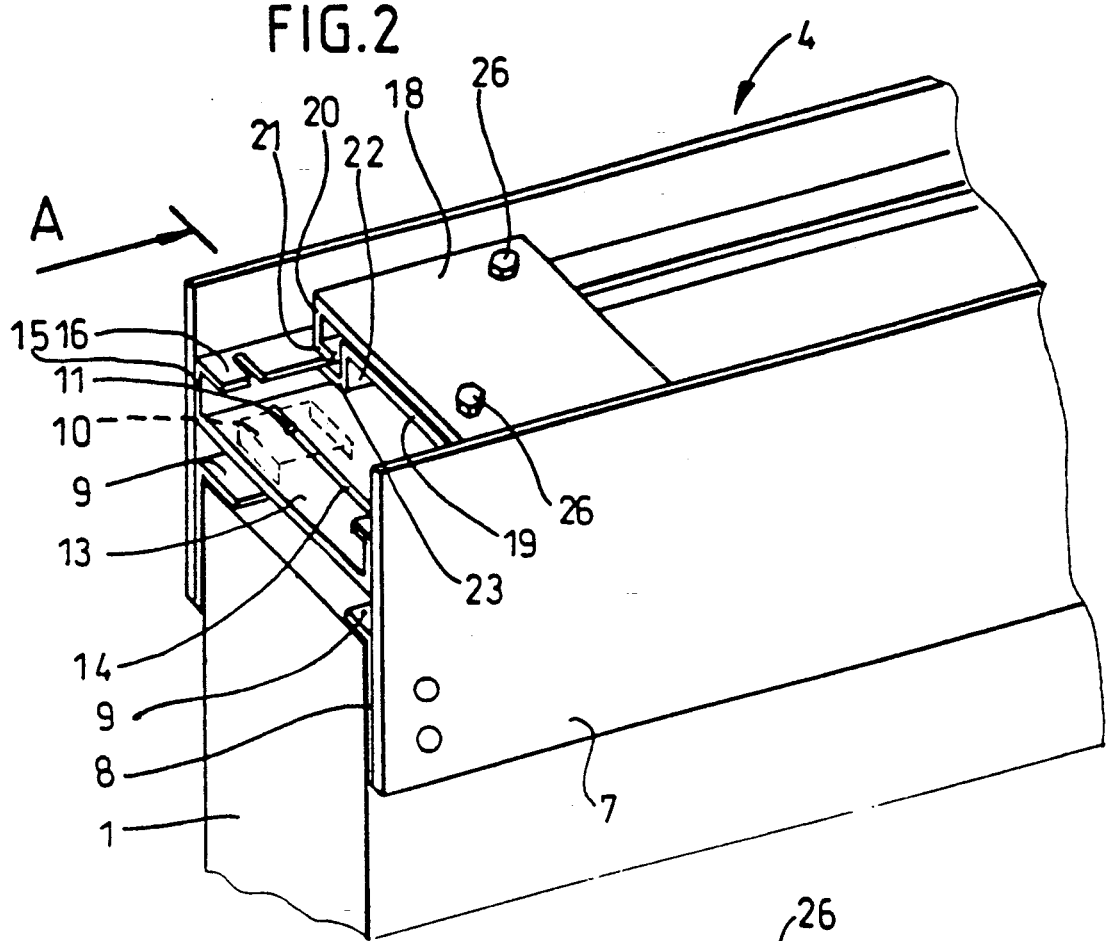
FIG. 2 is a perspective view on larger scale showing one portion of the width of the hooking device of FIG. 1.

FIG. 1 shows a double shelf-unit whose vertical central wall 1 is integral at each extremity with a vertical rack 2 able to support superimposed plates 3 disposed on each of the two sides of the wall 1. Surrounding the upper horizontal edge of the wall 1, the device shows a device 4 conforming to the invention and which supports rack portions 5 at the upper extremity and from which a luminous fronton 6 is hooked.

With reference now to FIGS. 2 to 5, the device 4 is made up of two identical half-rails disposed symmetrically with respect to the wall 1 of the shelf-unit. Each half-rail is constituted by a rectangular sheet steel member 7 whose internal face is secured by weld to an angle steel 8 with the same length as the member 7 whose upper horizontal wing 9 is directed inwardly. Identical blocks 10, made of sheet metal with an upturned U section and whose axis is orientated transversally to the direction of the wing 9, are secured to the upper face of the horizontal wing 9 by means of welding. At the center of the upper face of the block 10, a hole 11 is provided which opens into an internal insert 12 integral with the internal face of the block 10.

Figure 3:
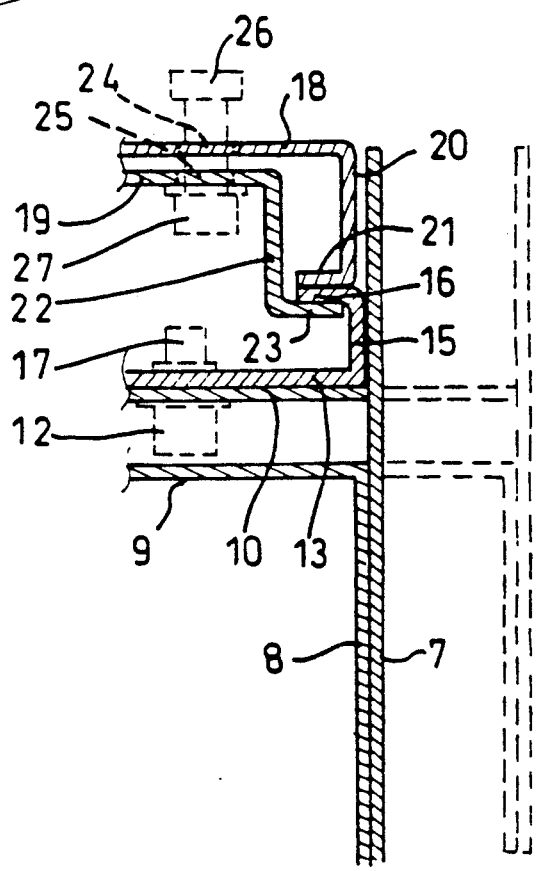
FIG. 3 is a partial transversal vertical cutaway view taken along the arrow A of FIG. 2.
Figure 4:
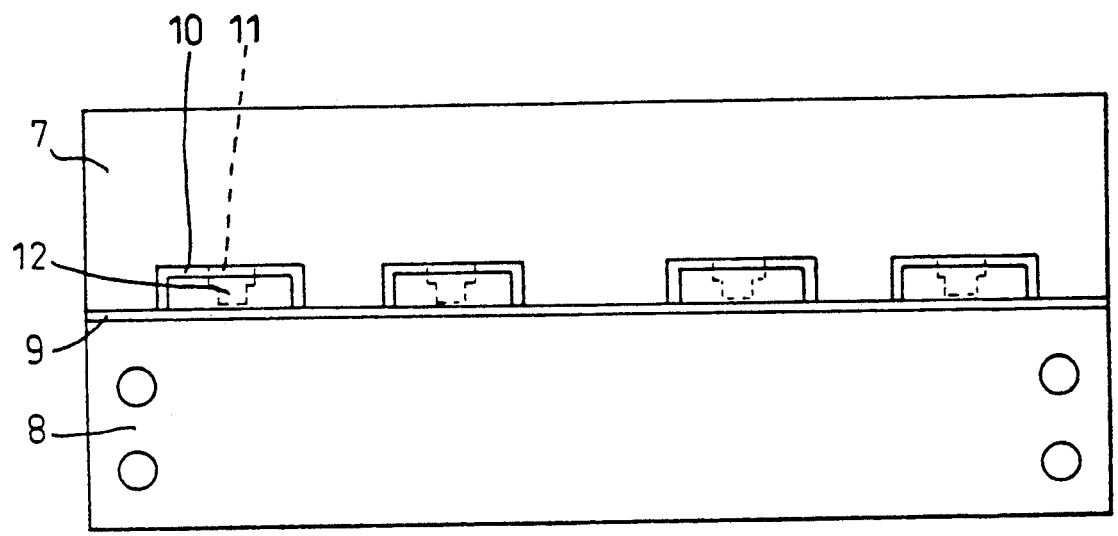
FIG. 4 is a front view on larger scale of the internal face of a half-rail of the hooking device of the invention.
Figure 5:
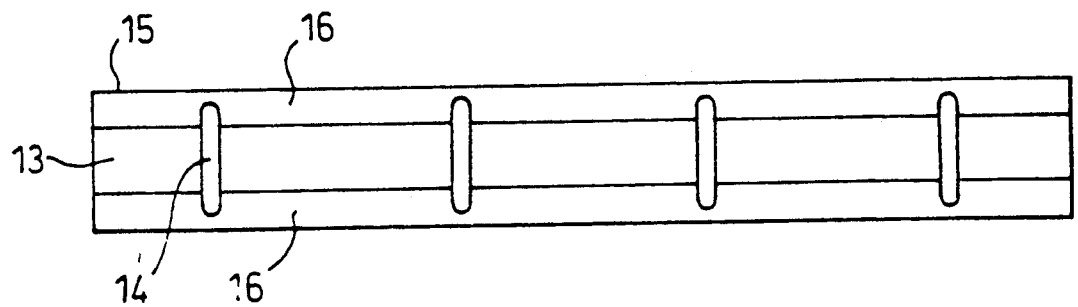
FIG. 5 is a plane view of the central support element of the hooking device of the invention.

A central support element 13 with the same length as that of the half-rails 8 is constituted by a rectangular sheet steel plate having, at regular intervals over its entire length, oblong cracks 14 orientated transversally. Symmetrical to the longitudinal axis of the sheet steel plate 13, each longitudinal edge of the latter is folded back upwards by 90 degrees so as to form a vertical wing 15 and then again by 90 degrees towards the inside so as to form a horizontal wing 16. The plate 13 is intended to come into support via its lower face on the upper face of the horizontal wings 9 opposite the two half rails. By means of the screw 17 traversing the cracks 14 and holes 11 opposite, the two half-rails and the central support element are rendered integral. By virtue of the disposition with oblong cracks 14, it is possible when the screws 17 are unscrewed to adjust at will the spacing of the two clamping elements between one minimum spacing position, in which the internal face of each half-rail abuts against the outer face of the vertical wing 15 of the central support element, and one maximum spacing position in which each extremity of the oblong crack 14 is situated opposite the hole 11 of the corresponding block 10. As shown on FIGS. 1 and 2, the fixing of the device is obtained by pressing the horizontal wings 9 of the angle steels 8 onto the upper edge of the wall 1 of the shelf-unit and then by clamping the latter between the internal vertical faces of the angle steels 8, which makes it possible to easily adapt the device to the thickness of this wall. The full line on FIG. 3 shows a half-rail in a minimum spacing position and the dot-and-dash line shows the same half-line in a maximum spacing position.

The device further includes two additional elements 18, 19 designed so as to directly support the decoration or similar elements to be hooked. Conversely, the upper element 18 has the same profile as the central support element 13 with one horizontal sheet metal portion with each of its two lateral edges being folded back symmetrically with respect to a vertical median longitudinal plane by 90 degrees downwards so as to constitute one vertical wing 20, and then by 90 degrees inwardly so as to constitute one horizontal wing 21. The horizontal wings 21 of the upper element 18 are intended to come into support respectively on the upper face of the horizontal wings 16 opposite the central support element 13. The lower element 19 includes one central horizontal portion which ends on each symmetrically with respect to a median longitudinal vertical plane by an S section including one vertical wing 22 orientated downwards which is continued by one horizontal wing 23 directed outwardly. The horizontal wings 23 are intended to be respectively applied against the lower face of the horizontal wings 16 opposite the central support element 13 and, to this effect, the spacing of the two vertical wings of the lower element 19 is slightly smaller than the spacing of the edges opposite the horizontal wings 16 of the element 13.

At two points disposed diagonally, the upper element 18 and the lower element 19 have superimposed holes, respectively 24 and 25, intended to be traversed by a screw 26 which is screwed into an internal insert 27 integral with the lower face of the element 19. On its upper face, the element 18 bears the rack portion 6 fixed by welding to which one extremity of the luminous fronton is to be hooked.

As the screws 26 connecting the elements 18 and 19 are not tightened, it is possible to move both these two elements by sliding along the wings 16 of the central element 13 as far as the desired position for the rack portion 5. Immobilization in this position is obtained by screwing of the screws 26, the horizontal wings 21 and 23 respectively of the elements 18 and 19 being clamped in either direction and acting as clamping jaws for clamping between them the wings 16.

It shall be observed that the foregoing description has been given solely by way of non-restrictive example, but constructive additions or modifications could be made without departing from the context of the invention. The invention has been described as being applicable to the hooking of a luminous fronton, but it could also be used for hooking all types of decoration, valorization or information elements or even a roof covering the shelf-unit.

What is claimed is:

1. Device for hooking decoration elements on all types of shelf units and including:
    (a) a shelf unit having a vertical wall having an upper longitudinal edge;
    (b) two identical half-rails applied opposite each other with each against said upper longitudinal edge of said vertical wall of said shelf unit;
    (c) one horizontal central element disposed between said two half-rails and presenting at a higher level two horizontal lateral return movements;
    (d) means for securing said central element to said half-rails to constitute a support unit;
    (e) said central element including means to adjust the spacing of said rails inside a horizontal plane and ensure the clamping of said upper longitudinal edge between said half-rails;
    (f) at least one support member slidingly mounted along said central element, said support member comprising two superimposed central portions and additional means for ensuring its guiding and securing along said horizontal central element, said additional means including horizontal longitudinal edges of said superimposed central portions, the horizontal longitudinal edges of first of said central portions pressing the upper face of said horizontal lateral return movements of said horizontal central element and the horizontal longitudinal edges of the second of said central portions being close to the lower face of said horizontal lateral return movements of the horizontal central element;
    (g) clamping means for clamping said additional means of said support member on the horizontal lateral return movements of said central element; and
    (h) means for hooking said decoration elements and integral with said support element.

2. Device according to claim 1 wherein each half-rail has on its internal face one horizontal wing having an adjustment hole and an upper face acting as a support for one longitudinal edge of said horizontal central element, said means for adjusting the spacing of the half-rails including at least one transverse crack provided inside the horizontal central element and situated opposite said adjustment hole borne by each horizontal wing, and one screw traversing said crack and said hole to render integral the half-rail with the central element in their mutual desired position.

3. Device according to claim 2 wherein said adjustment hole borne by said horizontal wing is fitted in the upper face of a block with a U-shaped section, the free extremity of the wings being secured to said horizontal wing, said adjustment hole opening into an insert housed between said block and said horizontal wing.

4. Device according to claim 1 wherein said clamping device includes a screw traversing said openings opposite the central portions of said elements and being screwed into an insert borne by one of said elements.

5. Device according to claim 2 wherein said horizontal wing of each half-rail is in support on the upper edge of the shelf unit wall to be equipped.

* * * * *